FLUX-INDEPENDENT INFORMATION STORAGE IN FERRITES

Filed July 23, 1962

INVENTOR
FREDERICK G. HEWITT
BY [signature]
ATTORNEY 3,331,064
Patented July 11, 1967

3,331,064

FLUX-INDEPENDENT INFORMATION STORAGE IN FERRITES

Frederick G. Hewitt, St. Paul, Minn., assignor to Sperry Rand Corporation, New York, N.Y., a corporation of Delaware Filed July 23, 1962, Ser. No. 211,796
16 Claims. (Cl. 340—174)

The present invention relates generally to a technique for improving the switching and information storage characteristics of a magnetic core member such as are presently utilized in data-processing systems, and more particularly to a technique for arranging switching pulses to such a magnetic core member in order to modify the nature of the storage mechanism, as well as the nature of the signal obtained upon switching the remanent state of the core.

In the operation of data processing equipment, particularly wherein information is normally stored, either temporarily or permanently, in memory cores such as, for example, ferrite cores, any system or technique that enhances the storage mechanism, switching operation or other operating parameters will obviously enhance the overall operation of the equipment.

In the technique of the present invention, it is possible to store binary information in a magnetic core utilizing a single state of remanent magnetic induction, the distinction in the switching history of the core determining the subsequent mode of operation of the core (rather than primarily the direction of remanent induction). The nature and behavior of the subsequent switching operation is also enhanced, inasmuch as the duration of the time-to-peak is shortened, and the voltage available in the output signal of the core may be increased.

In carrying out the technique of the present invention, the information to be stored in the ferrite core is written thereinto in accordance with a predetermined writing cycle, the writing cycle involving "time-limited" switching. Time-limited switching may be defined generally as that type of switching that is incomplete inasmuch as the switching pulse is applied for a period of time that is insufficient for the state of the core to achieve equilibrium with the applied field. On the other hand, a switching operation wherein sufficient time is allowed under any driving pulse for the core to completely stabilize in the new state is termed "amplitude-limited," since the amplitude alone determines the magnetic state of the core. Whenever less time is allowed under a switching pulse so that complete switching or achievement of substantial equilibrium does not occur, the operation may be defined as time-limited switching and the final state of magnetic induction or magnetization will be determined by both the amplitude and the duration of the pulse. It is this particular phenomenon that, according to the present understanding of the theory of operation, the present invention utilizes for its operation. Specifically the write operation may include a pair of writing pulses, the first being a presetting or preconditioning time-limited pulse having a sufficient amplitude but an insufficient duration to achieve equilibrium between the core and the applied field of the pulse, this presetting pulse being followed by a saturating "reset" pulse in the antiparallel or opposite sense from the preset pulse. The subsequent switching behavior of a core treated in this manner is distinct from a core not having this switching history. The output pulse obtained from this technique is characterized by its switching behavior in that a generally larger amplitude signal is obtained with a shorter duration to peak, as distinguished from a core having a conventional amplitude-limited switching history. In connection with this operation, and utilizing in addition thereto, the two normal (amplitude-limited) remanent states, it is possible to utilize the system to provide a ternary storage system (as distinguished from a binary system) if this is in fact desired. Readout may utilize biased coincident-current techniques, if desired, as well as others. In addition, coincident-current techniques using transverse fields may be utilized for faster operation.

Therefore, it is an object of the present invention to provide an enhanced mode of operation for a magnetic core element, the technique employing a pair of pulses including a time-limited presetting pulse that is followed by a "reset" pulse that is preferably substantially, antiparallel to the presetting pulse.

It is another object of the present invention to provide a magnetic memory element wherein binary information is stored therein in a single state of remanent magnetic induction.

It is a further object of the present invention to provide an improved and enhanced switching operation for a magnetic core, particularly a ferrite core, the switching being characterized by an output pulse having an increased amplitude together with a shortened "time-to-peak" duration than would be achieved from a corresponding core which has not been treated with the same switching history.

It is still a further object of the present invention to provide an improved mode of operation for a plurality of magnetic core elements, particularly ferrite core elements, wherein binary operation is feasible with each of the magnetic cores being held in the same remanent state of magnetic induction, the distinction between states being dependent upon the switching mode rather than upon the direction of switching.

It is yet a further object of the present invention to provide an improved switching scheme for magnetic core elements which utilizes coincident current switching techniques wherein both a longitudinal and a transverse field are applied, the coincident fields utilizing both a time-limited pulse and an amplitude-limited reset pulse.

Other and further objects of the present invention will become apparent to those skilled in the art upon a study of the following specifications, appended claims and accompanying drawings, wherein;

Figure 1:
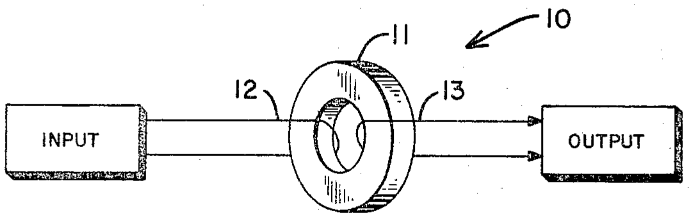
FIG. 1 is a perspective drawing illustrating a typical toroidal core having input and output windings operatively associated therewith.

In accordance with the preferred technique of the present invention, the memory system as shown in FIG. 1, and generally designated 10, includes a ferrite core member 11 together with an input winding 12 and an output winding 13. Conventional input devices are employed to drive the core, and conventional output sensing means are provided to sense, amplify or otherwise treat the output signals derived during operation of the system. The input drivers and the output detectors, as well as the windings, amplifiers and the like, are conventional, and well known in the art, and accordingly require no specific definition at this point.

In order to explain the operation of the technique of the present invention, conventional operation will be described initially. In the conventional or normal operation of this unit as illustrated in the broken line of FIG. 2 the previously restored core is provided with an initial input pulse in one direction or along one magnetic axis, such as is indicated adjacent the numeral 1 in FIG. 2. This initial pulse is normally of modest amplitude; however, it is sufficiently long in duration so as to bring the core to an equilibrium magnetic state determined by the amplitude of the applied field, this state being in a first inductive direction, or stated another way, along a first magnetic axis. This pulse may then be followed by a second saturating pulse in the opposite direction such as is indicated at the numeral 2, this pulse actually tending to saturate the core in the opposite magnetic direction and providing the conventional information storage in one binary sense for the system. The read and restore pulses for the core treated in accordance with conventional techniques are illustrated at numerals 3 and 4 respectively of FIG. 2. In accordance with one specific technique of the present invention, two write pulses are applied to the core, the pulse which is initially applied to the core in order to pre-set the core being a time-limited pulse. At the time this initial or presetting pulse is applied, the remanent state of the core is preferably in a state which is other than that which would merely permit the core to be driven further into saturation by the presetting pulse. A second pulse is then applied to the core, this second pulse being different in sense or direction of magnetic induction from the presetting pulse, and being arranged to drive the core to saturation along a certain magnetic axis. The second pulse is followed in due time and in accordance with other pulses according to the normal operation of the system as shown in FIG. 2.

The action of the ferrite core is determined at least in part by the previous switching history thereof. In conventional operation, where the initial input pulse is of a normal or conventional type, that is, when the core is substantially entirely switched to a remanent saturation point along one magnetic axis, the output is substantially as is indicated by the dotted line in FIG. 2. If, however, the initial input pulse has been of the time-limited type, the switching behavior of the core will be substantially different. In this regard the peak will be reached at an earlier point in time after initiation of the read pulse. The nature of the switching history, determines the behavior, this mode of behavior preferably being used to distinguish between the two possible binary states. In other words, the distinction in behavior may be utilized to distinguish between the two states and therefore, the initial presetting pulse constitutes the "information" pulse of this system.

The degree or extent of polarization or magnetic induction created by the presetting pulse is preferably about 50% of complete saturation or establishment of equilibrium in the direction of the applied field.

Figure 2:
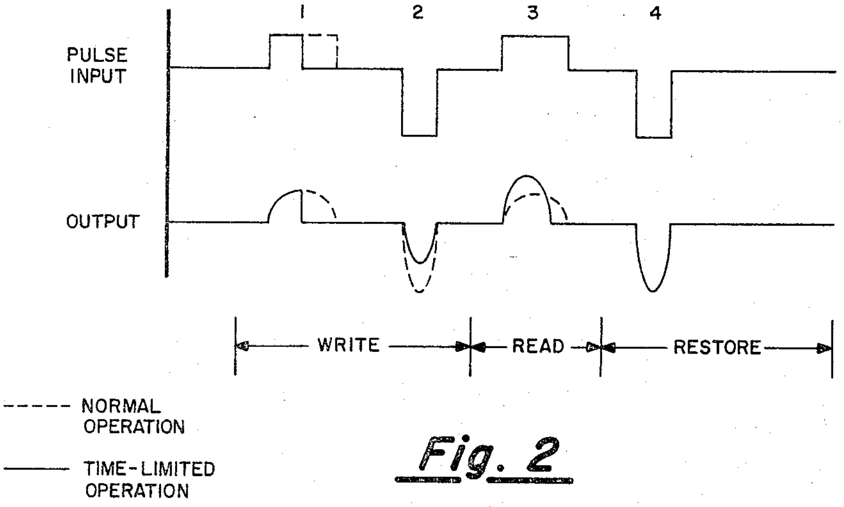
FIG. 2 is a plot, on a superimposed basis, of a typical input arranged in accordance with the teachings of the present invention, and in accordance with a typical conventional input together with the associated outputs achieved therefrom.

The output achieved from the conventional read when the magnetic state of remanence is reversed is illustrated in dotted lines as designated along FIG. 2. It will be observed that the signal obtained with a given core from conventional operation on a comparative basis is somewhat lower in amplitude and somewhat longer in duration then the signal obtained from a core having a history of "time-limited" switching. In this regard, the output signal achieved during the read cycle according to the technique of the present invention is unusual, this signal being substantially sharper, greater in amplitude, and shorter in duration. Duration of the time-to-peak is substantially less than that obtained from conventional pulses. In addition, the flux switched is sometimes different for cores treated in accordance with the present invention than it is with an identical core treated in a conventional manner. These features and characteristics may obviously be advantageously employed in connection with data processing equipment certain of the advantages being the greater simplicity available in treating the cores, in utilizing the outputs and the enhanced speed when the cores are reversed in their remanence.

While the precise theory of operation is not entirely understood, based upon the results which have been achieved, and based upon existing proven theory, it is believed that the initial time-limited or "disturb" pulse sets up a certain remanent polarization or induction state within the core which lacks uniformity of direction. In other words, the pulse is sufficiently short so as to render or permit a certain degree of random polarization or orientation to exist throughout the volume of the core body. Upon application of the second pulse in the cycle, the orientation which occurs due to the influence of this pulse creates a state within the core in which a plurality of 360° domain walls are set up. It is the presence of these 360° domain walls which are believed to provide nucleation centers which are adaptable for establishing a locus for initiating switching along the volume of the core member. Relating this to the operation of the present apparatus, these 360° domain walls assist the modes of switching in such a fashion that the entire subsequent switching behavior is significantly different. Because of this behavior, when the read pulses are applied to the oriented ferrite, the signals that occur may be distinguished according to the dictates of the particular data processing equipment involved.

The plot of FIG. 2 shows the signal output as a function of voltage amplitude. The typical output voltage from the core, when treated in accordance with the technique of the present invention is plotted on FIG. 2, along with a comparison curve which is a plot of a typical output that is obtained from a conventionally treated core. It will be seen from a comparison of the curves that the output of the core when switched or treated in accordance with the present invention, reaches a peak amplitude at a substantially earlier point in time than when a conventional treating cycle has been employed. It is believed that this enhanced effect is due to the presence of 360° domain walls which are established in the core during the writing cycle, these areas providing nucleation centers for initiating the switching action during the read pulse. Subsequently, the restore pulse is applied to the core in order to prepare for the next subsequent writing pulse.

Figure 4:
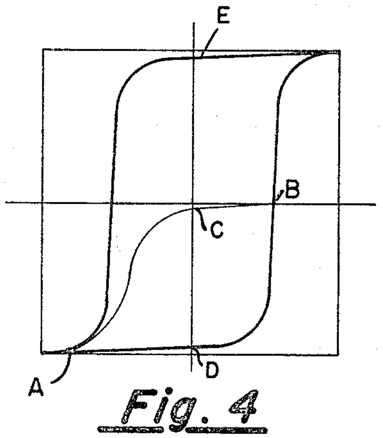
FIG. 4 is a plot of the hysteresis loop of a conventional ferrite core such as the toroidal core illustrated in FIG. 1, illustrating graphically the magnetic states or characteristics that are achieved during the progress of a writing operation in accordance with the present invention.

Turning now to the typical hysteresis loop in FIG. 4, for purposes of this illustration it will be presumed that the magnetization of the core lies in the state of remanence as indicated by point D of the drawing by the prior application of a restore pulse 4. For the first phase of the writing operation the initial time-limited presetting pulse 1 of positive polarity is inductively coupled to core 11 causing the magnetization of core 11 to move away from point D in a positive direction into a partially-switched (time-limited) remanent stable-state as at point C; this is a writing of a binary "1." For the writing of a binary "0" the time-limited presetting pulse time 1 would not be applied. Subsequent to the application, or nonapplication, of time-limited presetting pulse 1 the second phase of the writing operation consisting of inductively coupling negative polarity reset pulse 2 to core 11 causes the magnetization of core 11 to be re-established at point D. Thus, whether or not a time-limited presetting pulse 1 representative of the writing of a binary "1" or "0" has been priorly applied, the magnetization of core 11 is reset into its initial remanent stable-state point D by the application of pulse 2.

For the read operation, read pulse 3 of positive polarity is inductively coupled to core 11 causing the magnetization of core 11 to move away from point D in a positive direction through point B and into point E which in turn induces an output signal in sense line 13. This read output signal has the general waveform of the short time-to-peak solid line of the read output of FIG. 2 indicative of the prior application of the write "1" time-limited presetting pulse 1, or the long time-to-peak dashed-line of the read output of FIG. 2 indicative of the prior nonapplication of the write "1" time-limited presetting pulse 1.

Figure 3:
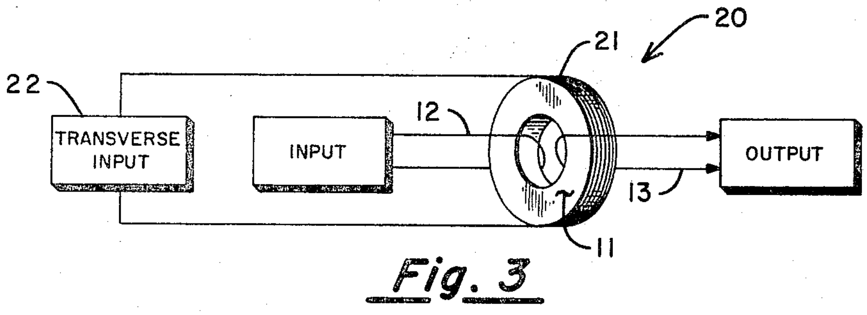
FIG. 3 is a perspective view of a system adapted for application of both longitudinal and transverse fields to a toroidal core.

In order to further utilize the techniques of the present invention, a transverse field H may be applied to the core during the writing cycle or other cycles. In this regard, however, it is important that during writing, the transverse field be applied along alternate 180° axes during any two phases of the write sequence. In other words, if the transverse field is applied at a direction of +90° from the initial presetting pulse, the second pulse in the write sequence should find the transverse field at an angle 180° removed from the first transverse field. It has been determined that if the transverse field is applied in the same direction during each phase of the write sequence, the effect of the enhanced read cycle is substantially lost. In fact, unless the direction of the transverse field is alternately reversed, the read cycle has been found to be substantially slower in time-to-peak duration. Relating this behavior to the theories pointed out hereinabove, since opposite sense 180° walls have been found to annihilate one another, it is felt that unless the transverse field is alternately reversed in direction during the write cycle, the opportunity of the 360° walls to form is reduced. The lack of 360° domain walls, if this is in fact the case, explains the anomalous behavior of the system experienced when the alternately reversing transverse field is applied. Referring now specifically to FIG. 3, it will be observed that the system generally designated 20 which includes the ferrite toroid 11 together with an input winding 12 and an output winding 13. In addition, the system is circumscribed by a larger winding 21 such as a solenoid winding which is driven by an input source 22. The source 22 is adapted to provide transverse pulses running alternately in either of two directions. This feature enables the generation of transverse fields which may be coupled to the core in order to assist the switching thereof and to modify the characteristic thereof.

Reference is made to Example I hereinbelow for a specific example of operation in accordance with the present invention.

*Example I*

In carrying out the technique set forth hereinabove, a ferrite core marketed by Indiana General Ceramic Corporation, Ceramic Division, Keasbey, N.J., sold under the designation of Code No. S5, is provided with an input winding having 4 turns and an output winding having 2 turns. The input is driven by a generator having an output of 50 volts at 1,000 mils, the presetting pulse utilizing a signal of 70 mils for a period of 9.6 micro-seconds. The second phase of the write pulse includes an input at 200 mils for a period of 5 micro-seconds. The read pulse is 70 mils for a period of 100 micro-seconds. The output is read from the 2 turn winding by conventional means, the output achieved being amplified, plotted, or otherwise treated in order to enable the use of the output per se. The time-to-peak for the output wherein the time limited pulse has been initially applied is 6.2 micro-seconds, while the time-to-peak for the same core treated with a conventional cycle is substantially longer, at 9.6 micro-seconds.

In addition to utilizing a single presetting pulse that will carry the magnetization of the core to a magnetic state as determined along the line B—C—A of FIG. 4, a plurality of time-limited pulses each of which is substantially smaller in magnitude than the pulse 1 as indicated hereinabove may be utilized. In this regard, the same effect may be obtained provided the core does not reach a magnetic equilibrium (steady) state which lies substantially at a maximum (saturated) level. The plurality of time-limited pulses may be in the form of a multiplicity of write cycles, if desired.

While the particular features of the present invention have been related chiefly to ferrite toroids, it will be appreciated that other cores may be utilized including metallic alloy cores, having either a bulk form or a film form. It will be further appreciated that the examples presented hereinabove are to facilitate an understanding of the technique of the present invention and are not to be construed as a limitation upon the scope to which the invention is otherwise entitled. Accordingly, those skilled in the art may depart from these specific examples without departing from the spirit and scope of the present invention.

What is claimed is:

1. A method of enhancing the switching characteristics of a magnetic core by decreasing the core's time-to-peak upon readout as indicative of the establishment of the magnetization of said core in a first of two binary states, said core having first and second stable-states of remanent magnetic polarization and wherein it is desired to drive the magnetization of said core from the second stable-state toward the first stable-state upon readout, said method comprising the steps of:

preconditioning said core in preparation for switching the magnetization of said core from said second stable-state of remanent polarization toward said first stable-state of remanent polarization upon readout wherein said preconditioning operation includes applying at least one time-limited switching pulse to said core while in said second stable-state to drive ward said first stable-state; and, thence applying a switching pulse to said core for driving the magnetization of said core back into said the magnetization of said core at least partially to-second stable-state of remanent magnetic polarization;

the application of said preconditioning operation effecting the writing into said core of a first of said binary states while the non-application of said preconditioning operation effects the writing into said core of a second of said binary states both said first and second of said two binary states represented by the magnetization of said core being at said second stable-state.

2. The method of claim 1 wherein said second stable-state is a substantially saturated magnetic state and said first stable-state is an amplitude-limited magnetic state.

3. The method of claim 1 wherein said first and second stable-states are substantially saturated magnetic states of opposite polarization.

4. The method of claim 1 wherein said first and second stable-states are different amplitude-limited magnetic states.

5. A method of enhancing the switching characteristics of a magnetic core by decreasing the core's time-to-peak upon readout as indicative of the establishment of the magnetization of said core in a first of two binary states, said core having first and second stable-states of remanent magnetic polarization and wherein it is desired to drive the magnetization of said core from the second stable-state toward the first stable-state upon readout, said method comprising the steps of:

preconditioning said core in preparation for switching the magnetization of said core from said second stable-state of remanent polarization toward said first stable-state of remanent polarization upon readout wherein said preconditioning operation includes applying at least one time-limited first switching pulse to said core while in said second stable-state to drive the magnetization of said core at least partially toward said first stable-state, and concurrently with the application to said core of said time-limited first switching pulse applying a transverse second switching pulse to said core in a first direction that is along an axis disposed approximately 90° from the magnetic direction of said time-limited first switching pulse; and thence applying a third switching pulse to said core for driving the magnetization of said core back into said second stable-state of remanent magnetic polarization, and concurrently with the application to said core of said third switching pulse applying a transverse fourth switching pulse to said core in a second direction that is substantially anti-parallel the first direction of said transverse second switching pulse;

the application of said preconditioning operation effecting the writing into said core of a first of said binary states while the non-application of said preconditioning operation effects the writing into said core of a second of said binary states, both said first and second of said two binary states represented by the magnetization of said core being at said second stable-state.

6. The method of claim 5 wherein said second stable-state is a substantially saturated magnetic state and said first stable-state is an amplitude-limited magnetic state.

7. The method of claim 5 wherein said first and second stable-states are substantially saturated magnetic states of opposite polarization.

8. The method of claim 5 wherein said first and second stable-states are different amplitude-limited magnetic states.

9. A magnetic memory element wherein two states of binary information are stored in a magnetic core in a single state of remanent magnetic induction wherein a first binary state is distinguished from the second binary state by the core's prior magnetic history of the application of a preconditioning step; comprising:

a magnetic core having a substantially rectangular hysteresis characteristic defining first and second oppositely polarized stable-states and having a third intermediate time-limited stable-state, both said first and second of said two binary states represented by the magnetization of said core being at said second stable-state;

preconditioning means selectively coupled to said core for selectively driving the magnetization of said core into said third stable-state from said second stable-state which selective coupling is representative of the selection of said first binary state;

reset means coupled to said core for driving the magnetization of said core into said second stable-state from said third stable-state;

read means coupled to said core for driving the magnetization of said core into said first stable-state from said second stable-state;

output means coupled to said core for intercepting the flux changes due to said driving of the magnetization of said core into said first stable-state from said second stable-state and for indicating whether said core's magnetization had previously been set into said third stable-state by said preconditioning means.

10. The element of claim 9 wherein said reset means is coupled to said core only when said preconditioning means has been immediately previously coupled to said core.

11. The element of claim 9 wherein said reset means is unconditionally coupled to said core whether or not said preconditioning means had been immediately previously coupled to said core.

12. A magnetic memory element wherein two states of binary information are stored in a magnetic core in a single state of remanent magnetic induction wherein a first binary state is distinguished from the second binary state by the core's prior magnetic history of the application of a preconditioning step; comprising:

a magnetic core having a substantially rectangular hysteresis characteristic defining first and second oppositely polarized substantially saturated stable-states and having a third intermediate time-limited stable-state, both said first and second of said two binary states represented by the magnetization of said core being at said second stable-state;

restore means coupled to said core for placing the magnetization of said core into said second stable-state;

preconditioning means selectively coupled to said core for selectively driving the magnetization of said core into said third stable-state from said second stable-state which selective coupling is representative of the selection of said first binary state;

reset means coupled to said core for driving the magnetization of said core back into said second stable-state from said third stable-state;

read means coupled to said core for driving the magnetization of said core into said first stable-state from said second stable-state;

output means coupled to said core for intercepting the flux changes due to said driving of the magnetization of said core into said first stable-state from said second stable-state and for indicating whether said core's magnetization had previously been set into said third stable-state.

13. A magnetic memory element wherein two states of binary information are stored in a magnetic core in a single state of remanent magnetic induction wherein a first binary state is distinguished from the second binary state by the core's prior magnetic history of the selective application of a preconditioning step, comprising:

a magnetic core having a substantially rectangular hysteresis characteristic defining first and second oppositely polarized stable-states and having a third intermediate time-limited stable-state, both said first and second of said two binary states represented by the magnetization of said core being at said second stable-state;

preconditioning means selectively coupled to said core for selectively driving the magnetization of said core into said third stable-state from said second stable-state which selective coupling is representative of the selection of said first binary state;

reset means coupled to said core for driving the magnetization of said core into said second stable-state from said third stable-state;

read means coupled to said core for effecting the magnetization of said core while in said second stable state for determining whether said core stores said first or said second binary state in said second stable-state;

output means coupled to said core for intercepting the flux changes due to said effecting of the magnetization of said core while in said second stable-state for indicating whether or not said core's magnetization had previously been set into said third stable-state by said preconditioning means.

14. The element of claim 13 wherein said second stable-state is a substantially saturated magnetic state and said first stable-state is an amplitude-limited magnetic state.

15. The element of claim 13 wherein said first and second stable-states are substantially saturated magnetic states of opposite polarization.

16. The element of claim 13 wherein said first and second stable-states are amplitude-limited magnetic states.

References Cited

UNITED STATES PATENTS

| | | | |
|---|---|---|---|
| 3,027,547 | 3/1962 | Froehlich | 340—174 |
| 3,126,534 | 3/1964 | Siegle | 340—174 |

OTHER REFERENCES

Pages 37 and 38, August 1952, IBM Technical Disclosure Bulletin, High Speed Core Memory by R. R. Booth.

BERNARD KONICK, *Primary Examiner.*

J. W. MOFFITT, *Examiner.*

UNITED STATES PATENT OFFICE

CERTIFICATE OF CORRECTION

Patent No. 3,331,064 July 11, 1967

Frederick G. Hewitt

It is hereby certified that error appears in the above numbered patent requiring correction and that the said Letters Patent should read as corrected below.

Column 6, line 30, after "drive" insert -- the magnetization of said core at least partially toward --; line 31, strike out "ward"; line 34, strike out "the magnetization of said core at least partially to-".

Signed and sealed this 30th day of July 1968.

(SEAL)
Attest:

Edward M. Fletcher, Jr.
Attesting Officer

EDWARD J. BRENNER
Commissioner of Patents